(12) United States Patent
Briffaud et al.

(10) Patent No.: US 11,299,588 B2
(45) Date of Patent: Apr. 12, 2022

(54) POLYAMIDE SYNTHESIS METHOD

(71) Applicant: ARKEMA FRANCE, Colombes (FR)

(72) Inventors: Thierry Briffaud, Caorches Saint Nicholas (FR); Pierre Nogues, Bernay (FR); Guillaume Le, Colombelles (FR); Frédéric Malet, Lyons (FR)

(73) Assignee: ARKEMA FRANCE, Colombes (FR)

(*) Notice: Subject to any disclaimer, the term of this patent is extended or adjusted under 35 U.S.C. 154(b) by 0 days.

(21) Appl. No.: 15/036,589

(22) PCT Filed: Nov. 14, 2014

(86) PCT No.: PCT/FR2014/052904
§ 371 (c)(1),
(2) Date: May 13, 2016

(87) PCT Pub. No.: WO2015/071604
PCT Pub. Date: May 21, 2015

(65) Prior Publication Data
US 2016/0280854 A1    Sep. 29, 2016

(30) Foreign Application Priority Data

Nov. 15, 2013 (FR) ...................................... 1361211

(51) Int. Cl.
*C08G 69/08* (2006.01)
*C08G 69/04* (2006.01)

(52) U.S. Cl.
CPC ............. *C08G 69/04* (2013.01); *C08G 69/08* (2013.01)

(58) Field of Classification Search
CPC ......... C08G 69/02; C08G 69/08; C08G 69/14
See application file for complete search history.

(56) References Cited

U.S. PATENT DOCUMENTS

| 6,011,134 | A | 1/2000 | Marks et al. |
| 2013/0116458 | A1 | 5/2013 | Couturier et al. |
| 2014/0323684 | A1* | 10/2014 | Dubois ................ C07C 253/22 528/310 |

FOREIGN PATENT DOCUMENTS

| ER | 1 426 092 A | 1/1966 |
| FR | 1 210 181 A | 3/1960 |
| FR | 1 210 182 A | 3/1960 |
| GB | 857062 | 12/1960 |
| GB | 857657 | 1/1961 |
| GB | 997511 | 7/1965 |
| JP | 57-080426 A | 5/1982 |
| JP | 11-342227 A | 12/1999 |
| JP | 11-343337 | * 12/1999 |
| JP | 2002-501961 A | 1/2002 |
| WO | 99/38909 A1 | 8/1999 |
| WO | WO 2011/138051 A1 | 11/2011 |

OTHER PUBLICATIONS

Perkins et al., "Nylon-9 from Unsaturated Fatty Derivatives: Preparation and Characterization", Journal of the American Oil Chemists' Society, Nov. 1975, pp. 473-477, vol. 52.
Carriere et al., "Polycondensation catalysee de l'amino-11 undecanoate d'ethyle", Bulletin De La Societe Chimique De France, Jan. 1970, pp. 1148-1150.
International Search Report (PCT/ISA/210) dated Feb. 9, 2015, by the European Patent Office as the International Searching Authority for International Application No. PCT/FR2014/052904.
Written Opinion (PCT/ISA/237) dated Feb. 9, 2015, by the European Patent Office as the International Searching Authority for International Application No. PCT/FR2014/052904.
Office Action (Notice of Reasons for Refusal) dated Apr. 24, 2018, by the Japanese Patent Office in corresponding Japanese Patent Application No. 2016-530975, and an English Translation of the Office Action. (11 pages).

* cited by examiner

*Primary Examiner* — Gregory Listvoyb
(74) *Attorney, Agent, or Firm* — Buchanan Ingersoll & Rooney P.C.

(57) ABSTRACT

The invention concerns a method for producing polyamide from an amino ester of formula $NH_2-(CH_2)_n-COOR$, in which R represents an alkyl group and n represents an integer ranging from 5 to 14, comprising:
  a first reaction step in the presence of water, at a first temperature;
  followed by a second reaction step at a second temperature higher than the first temperature.

17 Claims, No Drawings

POLYAMIDE SYNTHESIS METHOD

FIELD OF THE INVENTION

The present invention relates to a process for synthesizing polyamide from an amino ester, and also to the polyamide prepared according to this process.

TECHNICAL BACKGROUND

Polyamides are prepared by polycondensation of a diamine with a diacid, or by polycondensation of an amino acid.

It is known practice to provide the diacid or the amino acid in the form of an ester. For example, the article *Catalyzed polycondensation of ethyl 11-aminoundecanoate*, by F. Carrière and H. Sekiguchi, in *Bulletin de la société chimique de France*, 1970, p. 1148-1150, describes the polycondensation of ethyl aminoundecanoate in the presence of various acids.

Document JP 57080426 describes an equimolar reaction of hexamethylenediamine with a dimethyl carboxylate at a temperature of 110-160° C., in the presence of 40% to 90% by weight of water, followed by the elimination of the methanol produced in order to obtain an intermediate polyamide, which is then polymerized according to a conventional technique.

Document U.S. Pat. No. 6,011,134 describes the synthesis of PA 6.6 from monomethyl adipate and hexamethylenediamine, with a first reaction step (a) in equimolar proportions and in the presence of water, at a temperature of from 100 to 165° C., with simultaneous distillation of the methanol and of the water, then a second heating step (b) at a temperature from 200 to 260° C. at high pressure (at least 100 psig, i.e. 6.9 bar) with distillation of the residual water, followed by heating at a temperature of 270 to 280° C. with reduction of the pressure to atmospheric pressure in order to polycondense the distillation residue.

One problem notable in the context of the synthesis of polyamides from esters is that of the side reactions promoting in particular the occurrence of N-alkylated amines. These unwanted products disrupt the polycondensation and also the crystallization of the polyamides.

There is therefore a need to develop an improved process for producing polyamide, in particular from amino ester, exhibiting a reduced degree of N-alkylation.

SUMMARY OF THE INVENTION

The invention relates firstly to a process for producing polyamide from an amino ester of formula $NH_2$—$(CH_2)_n$—COOR, in which R represents an alkyl group and n represents an integer ranging from 5 to 14, comprising:
- a first reaction step in the presence of water, at a first temperature;
- followed by a second reaction step at a second temperature higher than the first temperature.

According to one embodiment, the second temperature is higher than the first temperature by at least 50° C., preferably by at least 60° C., more particularly preferably by at least 80° C., or even by at least 100° C.

According to one embodiment, the first temperature is lower than or equal to 120° C., preferably lower than or equal to 110° C., and more particularly preferably lower than or equal to 100° C.; and/or the second temperature is higher than or equal to 150° C., preferably higher than or equal to 180° C., and more particularly preferably higher than or equal to 200° C.

According to one embodiment, the duration of the first step is at least 20 minutes, preferably at least 40 minutes, more particularly preferably at least 60 minutes, or even at least 90 minutes.

Affording to one embodiment, R represents a linear or branched, and preferably linear, alkyl group comprising from 1 to 4 carbon atoms; and preferably, R is a methyl group or an ethyl group.

According to one embodiment, n is from 5 to 12 and preferably is 10 or 11; and preferably, the amino ester is methyl aminoundecanoate or methyl aminododecanoate.

According to one embodiment, the process comprises, during the first step, the distillation and elimination of the alcohol of formula R—OH.

According to one embodiment, the process comprises, before the first step or at the start of the first step, the addition of an organic solvent, preferably an alcohol, and more particularly preferably the alcohol of formula R—OH.

According to one embodiment, the process comprises, before the first step or at the start of the first step, the addition of a catalyst for hydrolysis of the amino ester, preferably chosen from NaOH and KOH.

According to one embodiment, the amino ester/water weight ratio at the start of the first step is from 1:5 to 5:1, preferably from 1:3 to 3:1, more particularly preferably from 1:2 to 2:1, and ideally approximately 1:1.

According to one embodiment, the process comprises the evaporation and elimination of water during the second step.

According to one embodiment, the first step is preferably carried out at a pressure lower than 1.1 bar absolute.

According to one embodiment, the process is a batchwise process.

According to one embodiment, the process is a continuous process.

The invention also relates to a polyamide that can be obtained according to the process described above.

According to one embodiment, it is a polyundecanamide or a polydodecanamide.

According to one embodiment, the polyamide has a degree of N-alkylation lower than or equal to 40 µeq/g, or lower than or equal to 10 µeq/g, preferably lower than or equal to 5 µeq/g, more particularly lower than or equal to 2 µeq/g, and ideally lower than or equal to 1 µeq/g.

The present invention makes it possible to overcome the prior art drawbacks. It provides more particularly a process for producing polyamide from amino ester in which the polyamide obtained exhibits a reduced degree of N-alkylation.

This is accomplished by virtue of a two-step system, namely a first step in the presence of water making it possible to hydrolyze the amino ester, and a second step of polycondensation of the amino acid resulting from this hydrolysis. Of course, the polycondensation can partially begin during the first step and the hydrolysis can partially continue during the second step.

In addition, the first step is carried out at a first temperature which is lower than that of the second step. Indeed, the present inventors have discovered that the temperature during the hydrolysis step has an extremely important effect on the degree of N-alkylation. The first step must therefore be carried out at a moderate temperature, whereas the second step is preferably carried out at a relatively high temperature in order to guarantee the efficiency of the polycondensation, i.e. in particular the obtaining of a polymer with a viscosity, measured in m-cresol, greater than 0.8.

Conversely, in document U.S. Pat. No. 6,011,134 relating to the production of PA 6.6 from hexamethylenediamine and monomethyl adipate, the N-methylation observed, on the one hand, reaches relatively high levels, and, on the other hand, is much less sensitive to temperature.

DESCRIPTION OF EMBODIMENTS OF THE INVENTION

The invention is now described in greater detail and in a nonlimiting manner in the description which follows.

Unless otherwise indicated, the proportions or percentages indicated are by weight.

The invention provides for the production of a polyamide from an amino ester of formula $NH_2—(CH_2)_n—COOR$, in which R represents an alkyl group and n represents an integer ranging from 5 to 14. The alkyl group is preferably unsubstituted.

According to one embodiment, two or more amino esters having different indices n are used, so as to form copolyamides.

However, it is preferred for a single amino ester having a single index n to be used, so as to form a homopolymer.

According to embodiments, n is higher than or equal to 6, but preferably n is higher than or equal to 7, or higher than or equal to 8, or even more preferably n is higher than or equal to 9, or higher than or equal to 10. Without wishing to be bound by a theory, the inventors consider that, the higher the index n, the less soluble in water is the amino acid resulting from the hydrolysis, and therefore the less likely said amino acid is to undergo an unwanted N-methylation.

According to one embodiment, n is 5 and the polyamide synthesized is PA 6 (polyhexanamide).

According to one preferred embodiment of the invention, n is included in the range from 7 to 14, preferably from 8 to 14, preferably from 9 to 14, preferably from 9 to 13, preferably from 9 to 11, preferably n is 9 or 10 or 11, preferably n is 10 or 11.

According to one embodiment, n is 10 and the polyamide synthesized is PA 11 (polyundecanamide).

According to one embodiment, n is 11 and the polyamide synthesized is PA 12 (polydodecanamide).

The R group is a linear or branched, and preferably linear, alkyl group. It may comprise, for example, from 1 to 4 carbon atoms. It may for example be a methyl, ethyl, propyl, isopropyl, n-butyl, isobutyl, sec-butyl or tert-butyl group. Ethyl and methyl groups are preferred, and quite particularly methyl.

The first step of the reaction is carried out in the presence of water and is intended to hydrolyze the amino ester, at a moderate first temperature limiting the production of N-alkylated compounds. The hydrolysis results in the production of amino acid of formula $NH_2—(CH_2)_n—COOH$ and of alcohol of formula R—OH.

The water/amino ester weight ratio can be, for example, from 1:5 to 5:1, or from 1:3 to 3:1, or from 1:2 to 2:1, or approximately 1:1.

Thus, the first temperature can be lower than or equal to 120° C.; or lower than or equal to 115° C.; or lower than or equal to 110° C.; or lower than or equal to 105° C.; or lower than or equal to 100° C.; or lower than or equal to 95° C.; or lower than or equal to 90° C.; or lower than or equal to 85° C.; or lower than or equal to 80° C.; or lower than or equal to 75° C.; or lower than or equal to 70° C.; or lower than or equal to 65° C.; or lower than or equal to 60° C.; or lower than or equal to 55° C.; or lower than or equal to 50° C.; or lower than or equal to 45° C.; or lower than or equal to 40° C.

Surprisingly and unexpectedly, this criterion of first temperature lower than or equal to 120° C. is all the more advantageous in the process of the invention since n is higher than or equal to 7, preferably higher than or equal to 9.

According to one embodiment, the hydrolysis of the amino ester is an enzymatic hydrolysis, catalyzed for example by lipases as described in the publication *Enzyme and Microbial Technology*, 30 (2002) p. 19-25.

The duration of the first step is for example at least 20 minutes, or at least 30 minutes, or at least 40 minutes, or at least 50 minutes, or at least 1 hour, or at least 1 hour 30, or at least 2 hours, or at least 3 hours.

During the first step, the first temperature is preferably constant. Alternatively, this first temperature can vary during the first step, for example monotonically or cyclically. A temperature increase phase can be provided at the start of the first step or before the first step. Preferably, it has a duration of less than 30 minutes, or less than 20 minutes, or less than 15 minutes, or less than 10 minutes.

The first step can be carried out under a vacuum of a few hundred mbar, at atmospheric pressure, or at a higher pressure (for example from 1.5 to 3 bar absolute).

Preferably, the alcohol of formula R—OH which is produced during the hydrolysis is distilled and eliminated during the first step (this is methanol in the preferred embodiment). The term "eliminated" in the present application signifies a removal, a separation of the compound concerned; it does not necessarily denote a total elimination of the compound. Thus, the reactor may comprise a residual alcohol content.

Alternatively, the alcohol can be eliminated in the second step (optionally simultaneously with the water), or even at the end of the reaction.

According to one embodiment, a solvent is introduced into the medium before the first step, or at the start of the first step, so as to promote the association of the water with the amino ester. By way of the solvent, use may in particular be made of the alcohol R—OH (therefore preferably methanol), but also aprotic polar solvents such as dioxane, tetrahydroxyfuran, dimethyl sulfoxide, Ia n-methylpyrrolidone or acetonitrile. Preferably, the weight fraction of solvent is less than or equal to 70%, preferably less than or equal to 50%, 30% or 20%.

It is also possible to introduce into the medium a catalyst for hydrolysis of the amino ester, either before the first step or at the start of the first step. This catalyst is preferably an inorganic base (alkali metal hydroxide or alkaline-earth metal hydroxide, such as NaOH, KOH, $Ca(OH)_2$ or $Ba(OH)_2$). Use may also be made of a strong aprotic organic base such as triazabicyclodecene, triazole, 1,8-diazabicyclo [5.4.0]undec-7-ene (DBU), 1,5-diazabicyclo[4.3.0]non-5-ene (DBN), 1,4-diazabicyclo[2.2.2]octane (DABCO), etc.

This catalyst is preferably used in a concentration of less than or equal to 1 mol % relative to the amino ester.

Advantageously, the reaction mixture is activated by applying ultrasound, or by controlled mechanical cavitation, or by applying microwave radiation.

The amino ester can also be introduced into the hydrolysis medium continuously over a period of a few hours (preferably 1 to 5).

The second step of the reaction is intended to polycondense the amino acid resulting from the hydrolysis so as to form the desired polyamide. This second step is usual for a polymerization of amines and of acids resulting in polyamides. It can be carried out in solid phase or in molten phase.

This second step is carried out at a second temperature higher than the first for better efficiency of the polycondensation. The second temperature is, for example, higher than or equal to 150° C., or higher than or equal to 160° C., or higher than or equal to 170° C., or higher than or equal to 180° C., or higher than or equal to 190° C., or higher than or equal to 200° C., or higher than or equal to 210° C., or higher than or equal to 220° C., or higher than or equal to 230° C., or higher than or equal to 240° C.

The duration of the second step depends on the temperature and on the optional content of catalyst.

During the second step, the second temperature is preferably constant. Alternatively, this second temperature can vary during the second step, for example monotonically or cyclically. A temperature increase phase is provided for between the first step and the second step. Preferably, it has a duration of less than 30 minutes, or less than 20 minutes, or less than 15 minutes, or less than 10 minutes, or less than 5 minutes.

The second step is generally carried out at a pressure higher than that of the first step, namely a water vapor pressure lower than or equal to the saturating vapor pressure of water at the temperature considered. Alternatively, in particular in the event of a continuous process, the two steps can be carried out at atmospheric pressure.

Preferably, the water is evaporated and eliminated during the second step which then ends with a phase under atmospheric pressure or even under vacuum.

A catalyst for the polycondensation of the amino acid can be introduced into the medium either before the first step, or during the first step, or between the first step and the second step, or at the start of the second step, such as phosphoric acid or hypophosphorous acid. The amount of catalyst is less than or equal to 3000 ppm relative to the amount of the aliphatic polyamide and advantageously between 50 and 1000 ppm.

Various additives can also be introduced into the medium a catalyst for the polycondensation of the amino acid, even before the first step, or during the first step, or between the first step and the second step, or at the start of the second step, namely: UV stabilizers, heat stabilizers and/or plasticizers.

The molecular weight of the polyamide obtained can be controlled conventionally by monitoring the melt viscosity of the product. A chain regulator (for example monocarboxylic acid, monoamine, diacid or diamine) can optionally be added in order to limit the extent of the polymerization.

At the end of the reaction, the polyamide is collected from the reactor in the molten state.

The polyamide obtained according to the process of the invention is characterized by:
- a residual content of ester chain ends greater than 0.1 or than 1 µeq/g;
- a low degree of N-alkylation (N-methylation in the event of the R group being the methyl group), namely a degree of N-alkylation lower than or equal to 40 µeq/g, or lower than or equal to 30 µeq/g, or lower than or equal to 20 µeq/g, or lower than or equal to 10 µeq/g, or lower than or equal to 5 µeq/g, or lower than or equal to 2 µeq/g, or lower than or equal to 1 µeq/g.

The degree of ester chains ends and of N-alkylation can be measured by NMR analysis after dissolution in a hexafluoroisopropanol (or HFIP)/CD$_2$Cl$_2$ mixture. The value in µeq/g corresponds to the number of µmol of compounds (ester or N-alkylated compounds) per gram of polyamide. The N-alkylated compounds include N-alkylamine and di-N-alkylamine chain ends and also tertiary N-alkylamide structures.

EXAMPLES

The following examples illustrate the invention without limiting it.

Example 1

Hydrolysis of the 11-Amino Methyl Ester at a Temperature of 110° C. then Polymerization at 250° C.

The reaction mixture is a water/11-amino methyl ester mixture in a 1:1 weight ratio. The reaction mixture is introduced into a reactor at total reflux. The reaction is carried out at a setpoint temperature of 145° C., corresponding to a reaction mixture temperature of 110° C. The duration of the reaction is 90 minutes. The medium is then lyophilized (so as to eliminate the water and the methanol), and the lyophilisate is analyzed by NMR. The content of N-methylated compounds is below the limit of detection of 5 µeq/g.

The lyophilisate is then heated at 250° C. under nitrogen flushing in a glass reactor previously inerted with nitrogen. After heating for 2 h 30, the polymer obtained is cooled and then analyzed by NMR. The content of N-methylated compounds is 42 µeq/g. Among these compounds, the content of N-dimethylated chain ends is 3 µeq/g.

Example 2

Hydrolysis of the 11-Amino Methyl Ester at a Temperature of 130° C. then Polymerization at 250° C.

The reaction mixture is a water/11-amino methyl ester mixture in a 1:1 weight ratio. The reaction mixture is introduced into a reactor at total reflux. The reaction is carried out at a reaction mixture temperature of 130° C. The duration of the reaction is 90 minutes, after a heating phase at 5° C./min. The medium is stirred at 10 rpm. The pressure at the end of the reaction is approximately 2.8 bar.

The medium obtained is a two-phase medium (pasty white phase and liquid phase). It is mixed and then lyophilized (so as to eliminate the water and the methanol), and the lyophilisate is analyzed by NMR. The content of N-methylated compounds is 38 µeq/g.

The lyophilisate is then heated at 250° C. under nitrogen flushing in a glass reactor inerted beforehand with nitrogen. After heating for 2 h 30, the polymer obtained is cooled and then analyzed by NMR. The content of N-methylated compounds is 73 µeq/g. Among these compounds, the content of N-dimethylated chain ends is 7 µeq/g.

Example 3

Hydrolysis of the 12-Amino Methyl Ester at a Temperature of 110° C. then Polymerization at 250° C.

The reaction mixture is a water/12-amino methyl ester mixture in a 1:1 weight ratio. The reaction mixture is introduced into a reactor at total reflux. The reaction is carried out at a setpoint temperature of 145° C., corresponding to a reaction mixture temperature of 110° C. The duration of the reaction is 90 minutes. The medium is then lyophilized (so as to eliminate the water and the methanol).

The lyophilisate is then heated at 250° C. under nitrogen flushing in a glass reactor inerted beforehand with nitrogen. After heating for 2 h 30, the polymer obtained is cooled and then analyzed by NMR. The content of N-methylated compounds is 32 µeq/g. Among these compounds, the content of N-dimethylated chain ends is 4 µeq/g.

Example 4

Hydrolysis of the 6-Amino Methyl Ester at a Temperature of 110° C. then Polymerization at 250° C.

The reaction mixture is a water/6-amino methyl ester mixture in a 1:1 weight ratio. The reaction mixture is introduced into a reactor at total reflux. The reaction is carried out at a setpoint temperature of 145° C., corresponding to a reaction mixture temperature of 110° C. The duration of the reaction is 90 minutes. The medium is then lyophilized (so as to eliminate the water and the methanol).

The lyophilisate is then heated at 250° C. under nitrogen flushing in a glass reactor inerted beforehand with nitrogen. After heating for 2 h 30, the polymer obtained is cooled and then analyzed by NMR. The content of N-methylated compounds is 12 µeq/g. Among these compounds, the N-dimethylated chain ends are not detected.

Example 5

Hydrolysis of the 6-Amino Methyl Ester at a Temperature of 130° C. then Polymerization at 250° C.

The reaction mixture is a water/6-amino methyl ester mixture in a 1:1 weight ratio. The reaction mixture is introduced into a reactor at total reflux. The reaction is carried out at a reaction mixture temperature of 130° C. The duration of the reaction is 90 minutes. The medium is then lyophilized (so as to eliminate the water and the methanol).

The lyophilisate is then heated at 250° C. under nitrogen flushing in a glass reactor inerted beforehand with nitrogen. After heating for 2 h 30, the polymer obtained is cooled and then analyzed by NMR. No N-methylated compound is detected.

Example 6

Heating of the 11-Amino Methyl Ester Without Water at a Temperature of 110° C. then Polymerization at 250° C.

The 11-amino methyl ester is introduced into a reactor at total reflux. The reaction is carried out at a reaction mixture temperature of 110° C. The duration of the reaction is 90 minutes. The medium is then lyophilized (so as to eliminate the methanol).

The lyophilisate is then heated at 250° C. under nitrogen flushing in a glass reactor inerted beforehand with nitrogen. After heating for 2 h 30, the polymer obtained is cooled and then analyzed by NMR. It is brittle and has an unpleasant rotting fish odor. The content of N-methylated compounds is 150 µeq/g. Among these compounds, the content of N-dimethylated chain ends is 95 µeq/g.

The invention claimed is:

1. A process for producing a polyamide comprising:
   a first reaction step of hydrolyzing an amino ester of formula $NH_2-(CH_2)_n-COOR$ in the presence of water at a first temperature wherein said first temperature is lower than or equal to 120° C., wherein R represents an alkyl group and n represents an integer ranging from 9 to 14;
   followed by a second reaction step of polymerizing at a second temperature higher than the first temperature; wherein said second temperature is at least 50° C. higher than the first temperature;
   wherein the first reaction step partially continues into the second reaction step, and wherein the water from the first reaction step is eliminated in the second reaction step, and wherein the polyamide formed from said process possesses a residual content of ester chain ends greater than 0.1 µeq/g.

2. The process as claimed in claim 1, wherein the first temperature is lower than or equal to 110° C.

3. The process as claimed in claim 1, wherein a duration of the first reaction step is at least 20 minutes.

4. The process as claimed in claim 1, wherein R represents a linear or branched alkyl group comprising from 1 to 4 carbon atoms.

5. The process as claimed in claim 1, wherein n is from 9 to 12; and wherein the amino ester is methyl aminoundecanoate or methyl aminododecanoate.

6. The process as claimed in claim 1, comprising, during the first reaction step, distillation and elimination of an alcohol of formula R—OH.

7. The process as claimed in claim 1, comprising, before the first reaction step or at the start of the first reaction step, addition of a catalyst for the hydrolysis of the amino ester.

8. The process as claimed in claim 1, wherein the amino ester/water weight ratio at a start of the first step is from 1:5 to 5:1.

9. The process as claimed in claim 1, comprising evaporation of the water from the first reaction step during the second reaction step.

10. A polyamide that can be obtained according to the process of claim 1.

11. The polyamide as claimed in claim 10, which is a polyundecanamide or a polydodecanamide.

12. The process as claimed in claim 1, wherein n is higher than or equal to 10.

13. A process for producing a polyamide comprising:
   a first reaction step of hydrolyzing an amino ester of formula $NH_2-(CH_2)_n-COOR$ in the presence of water at a first temperature, wherein R represents an alkyl group and n represents an integer ranging from 9 to 14;
   followed by a second reaction step of polymerizing at a second temperature higher than the first temperature; wherein said second temperature is at least 50° C. higher than the first temperature; and wherein the process further comprises:
   before the first reaction step or at the start of the first reaction step, addition of a catalyst for the hydrolysis of the amino ester,
   wherein the first reaction step partially continues into the second reaction step, and wherein the water from the first reaction step is eliminated in the second reaction step, and wherein the polyamide formed from said process possesses a residual content of ester chain ends greater than 0.1 µeq/g.

14. The process of claim 1, wherein the polyamide produced exhibits a degree of alkylation lower than or equal to 42 µeq/g.

15. The process of claim 13, wherein the polyamide produced exhibits a degree of alkylation lower than or equal to 42 µeq/g.

16. The process of claim 1, wherein before the first reaction step or at a start of the first reaction step, an organic solvent is added.

17. The process of claim 1, wherein the first reaction step is carried out at a pressure lower than 1.1 bar absolute.

* * * * *